(12) United States Patent
Katsumata et al.

(10) Patent No.: US 7,587,406 B2
(45) Date of Patent: Sep. 8, 2009

(54) INFORMATION PROCESSOR, INFORMATION PROCESSING METHOD, PROGRAM AND RECORDING MEDIUM

(75) Inventors: Mitsuru Katsumata, Tokyo (JP); Ichiro Sato, Chiba (JP); Hiroyuki Ichikawa, Tokyo (JP); Haruki Hayakawa, Niigata (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 11/206,918

(22) Filed: Aug. 19, 2005

(65) Prior Publication Data

US 2006/0069695 A1 Mar. 30, 2006

(30) Foreign Application Priority Data

Sep. 29, 2004 (JP) ............................. 2004-285066

(51) Int. Cl.
G06F 7/00 (2006.01)

(52) U.S. Cl. ................................ 707/101; 707/1; 707/4

(58) Field of Classification Search .................. 707/101
See application file for complete search history.

(56) References Cited

U.S. PATENT DOCUMENTS 5,835,712 A * 11/1998 DuFresne ................... 709/203
6,671,701 B1 * 12/2003 Chouinard .................. 707/201
6,725,426 B1 * 4/2004 Pavlov ....................... 715/205
6,732,095 B1 5/2004 Warshavsky et al.
6,748,402 B1 * 6/2004 Reeves et al. ............... 707/201
6,799,184 B2 * 9/2004 Bhatt et al. ................. 707/102
6,874,002 B1 * 3/2005 Peleus et al. ................ 707/204
6,938,005 B2 * 8/2005 Iverson et al. ................ 705/27
2004/0068509 A1 4/2004 Garden et al.
2005/0267949 A1 * 12/2005 Scott, III .................... 709/219

* cited by examiner

Primary Examiner—Don Wong
Assistant Examiner—Binh V Ho
(74) Attorney, Agent, or Firm—Oblon, Spivak, McClelland, Maier & Neustadt, P.C.

(57) ABSTRACT

An information processor for preventing information contained in a file, which has a first area storing first data, a second area storing second data and a third area, from being lost when a format of the file is transformed includes extension unit for extending the second area, a first storage for storing the first data, which is stored in the first area, in the third area, a format analyzer for reconstructing the second data stored in the second area on the basis of a first format and an extended area storage for storing the reconstructed second data in the extended second area.

12 Claims, 8 Drawing Sheets

FIG. 2
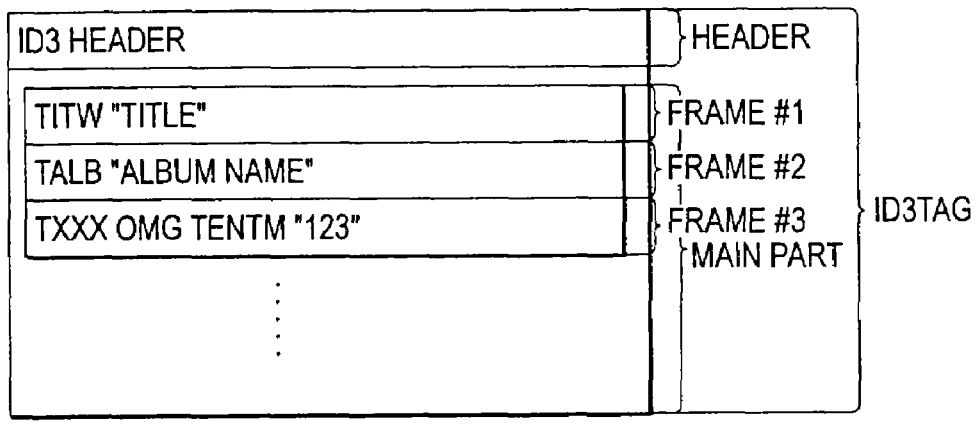
FIG. 3
FILE B
```
<XML>
<TRACK><title>
"TITLE"
</title></TRACK>
<ALBUM><title>
"ALBUM NAME"
</title></ALBUM>
</XML>
```
FIG. 4
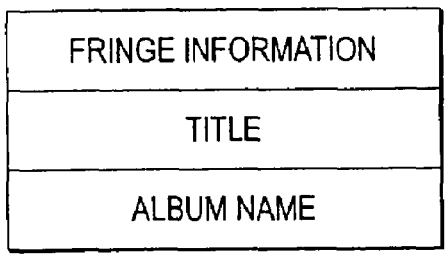

INFORMATION PROCESSOR, INFORMATION PROCESSING METHOD, PROGRAM AND RECORDING MEDIUM

CROSS REFERENCES TO RELATED APPLICATIONS

The present invention contains subject matter related to Japanese Patent Application JP 2004-285066 filed in the Japanese Patent Office on Sep. 29, 2004, the entire contents of which being incorporated herein by reference.

BACKGROUND OF THE INVENTION

1. Field of the Invention

The present invention relates to an information processor, an information processing method, a program and a recording medium. In particular, the present invention relates to an information processor, an information processing method, a program and a recording medium, with which loss of information included in a file when a format of the file is transformed can be prevented.

2. Description of the Related Art

A fringe information such as title of music, artist information and cover art, etc., may be attached to a file of, for example, music data or moving picture data (referred to as "contents file", hereinafter). The fringe information, which can be attached to the contents file, is different depending on format of the contents file.

Further, it has been known that, in recording the contents file, the format of the contents file is transformed, on demand.

JP-A-2000-194612 discloses a contents transforming method for transforming an original electronic document written by HTML (Hyper Text Markup Language) into an original electronic document written by WML (Wireless Markup Language).

SUMMARY OF THE INVENTION

However, when the format of the contents file, to which the fringe information is attached, is transformed, there may a case where a portion of the fringe information of the contents file is lost because fringe information attached to contents file is different depending on format of the contents file.

For example, in a contents file whose format is MP3 (MPEG (Moving picture Experts Group)—1 Audio Layer 3), a fringe information, which can be attached as ID3v2 tag, are [music title], [artist name], [information related to artist's WEB (World Wide Web) page] and [entry time of music], etc. Incidentally, ID3v2 tag is disclosed in http://www.id3.org.

On the other hand, in a contents file, whose format is suitable to attach a fringe information having format based on XML (Extensible Markup Language) to the file, the attachable fringe information are [music title], [artist name], [information related to artist's WEB page], etc., and it does not include, for example, [music time].

Therefore, when a contents file of MP3 format is transformed to a contents file of a format in which a fringe information based on XML is attached, the fringe information [music time] attached to the contents file of MP3 format is not attached to the contents file of the format, to which the fringe information based on XML is attached. That is, the fringe information [music time], which is attached to the contents file before format transformation, is lost in the contents file after format transformation.

The present invention was made in view of this fact and addresses a prevention of loss of information, which is included in an original file, when a format of the file is transformed.

According to a first embodiment of the present invention, an information processor for processing a file having a first area storing first data, a second area storing second data and a third area, includes an extension unit for extending the second area, a first storage for storing the first data, which is stored in the first area, in the third area, a reconstruction unit for reconstructing the second data stored in the second area on the basis of a first format and a second storage for storing the second data, which is reconstructed by the reconstruction unit, in the second area extended by the extension unit.

The information processor further includes a memory for storing a list of the first data and the reconstruction unit reconstructs the second data when the second data is decided as stored in the first file on the basis of the list stored in the memory.

An information processing method according to a first embodiment of the present invention includes the steps of extending a second area of a file, storing first data, which is stored in a first area, in a third area, reconstructing second data stored in the second area on the basis of a first format and storing the second data reconstructed by the reconstructing step in the second area extended by the extending step.

A program according to another embodiment of the present invention includes the steps of extending a second area of a file, storing first data, which is stored in a first area, in a third area, reconstructing second data stored in the second area on the basis of a first format and storing the second data reconstructed by the reconstructing step in an extended area extended by the extending step.

A recording medium according to another embodiment of the present invention includes the steps of extending a second area of a file, storing a first data stored in a first area in a third area, reconstructing the second data stored in the second area on the basis of a first format and storing the second data reconstructed by the reconstructing step in an extended area extended by the extending step.

In the information processor, the information processing method, the program and the recording medium according to the first embodiments, the second area of the file is extended and the first data stored in the first area is stored in the third area. Further, the second data reconstructed on the basis of the first format is stored in the extended area.

An information processor according to another embodiment of the present invention includes a first storage for storing first data, which is stored in a first area, in a second area, an extraction unit for extracting second data from third data and a second storage for storing the second data extracted by the extraction unit in a third area.

An information processing method according to another embodiment of the present invention includes the steps of storing first data stored in a first area in a second area, extracting second data from third data and storing the second data extracted by the extracting step in a third area.

A program according to another embodiment of the present invention includes the steps of storing first data stored in a first area in a second area, extracting second data from third data and storing the second data extracted by the extracting step in a third area.

A recording medium according to another embodiment of the present invention includes the steps of storing first data stored in a first area in a second area, extracting second data from third data and storing the second data extracted by the extracting step in a third area.

In the information processor, the information processing method, the program and the recording medium according to the second embodiments, the first data stored in the first area is stored in the second area and the second data is extracted from the third data. Further, the extracted second data is stored in the third area.

According to the present invention, it is possible to prevent information contained in the file before transformation of file format from being lost in the file after format transformation.

BRIEF DESCRIPTION OF THE DRAWINGS

FIG. 2 shows an example of a file A;

FIG. 3 shows an example of an original file B stored in an original file B memory 11 shown in FIG. 1;

FIG. 4 shows an example of a list stored in a list memory shown in FIG. 1;

DETAILED DESCRIPTION OF THE INVENTION

Figure 1:
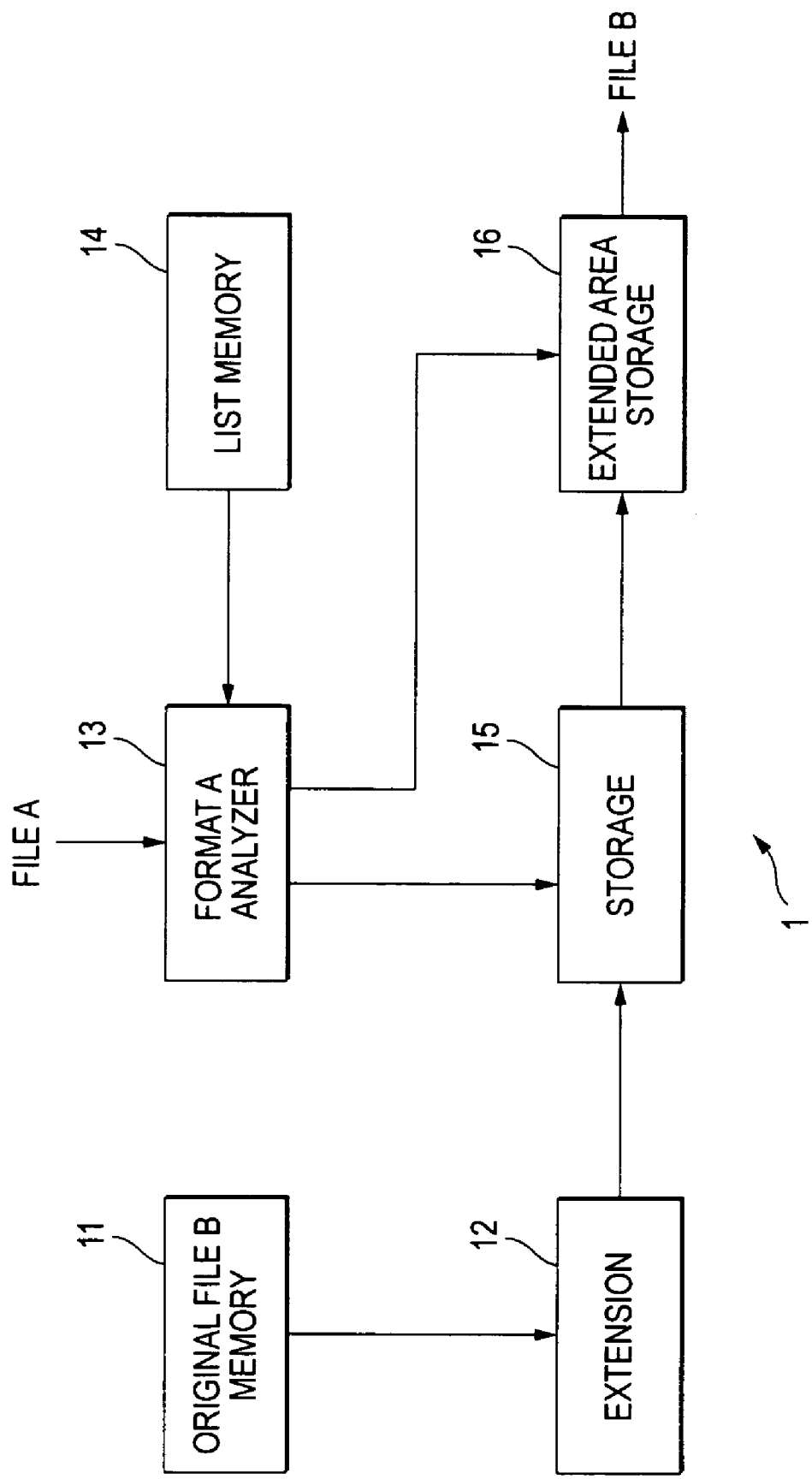
FIG. 1 is a block diagram showing a functional construction of a transformer to which the present invention is applied.

The present invention will be described summarily and then in detail with reference to embodiments shown in the drawings.

Figure 5:
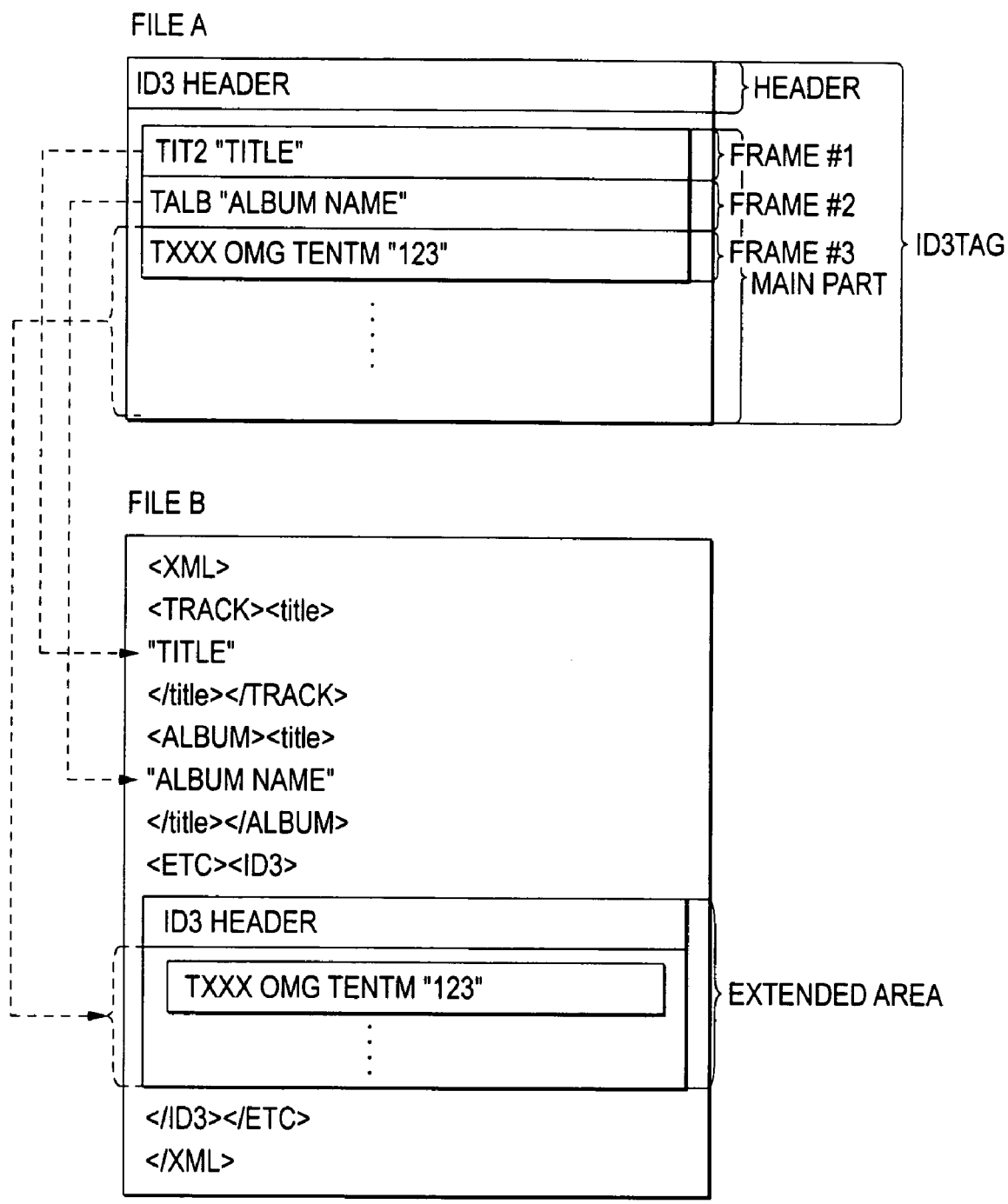
FIG. 5 shows the file A before its format is transformed (FIG. 2) and an example of the file B after its format is transformed.

An information processor (such as a transformer 1 shown in FIG. 1) according to an embodiment of the present invention, which is adapted to transform a first format of a first file (such as a file A of first format A) having a first area (such as frame #1 shown in FIG. 2) for storing first data (such as fringe information "title") and a second area (such as frame #3 in FIG. 2) for storing second data (such as fringe information "123") to a second format of a second file (such as a file B of format B) including a third area (such as an area between an XML start tag <TRACK><title> and an XML end tag </title></TRACK>) for storing the first data and having no fourth area, in which the second data is to be stored, includes an extension unit (such as an extension unit 12 shown in FIG. 1) for extending the second file area, a first storage (a storage 15 shown in FIG. 1) for storing the first data, which is stored in the first area, in the third area, a reconstruction unit (such as a format A analyzer 13 in FIG. 1) for reconstructing the second data stored in the second area on the basis of the first format and a second storage (such as an extended area storage 16 shown in FIG. 1) for storing the second data, which is reconstructed by the reconstruction unit in an area (such as an area between an XML start tag <ETC><ID3> and an XML end tag </ID3></ETC> shown in FIG. 5), which is extended by the extension unit.

Figure 6:
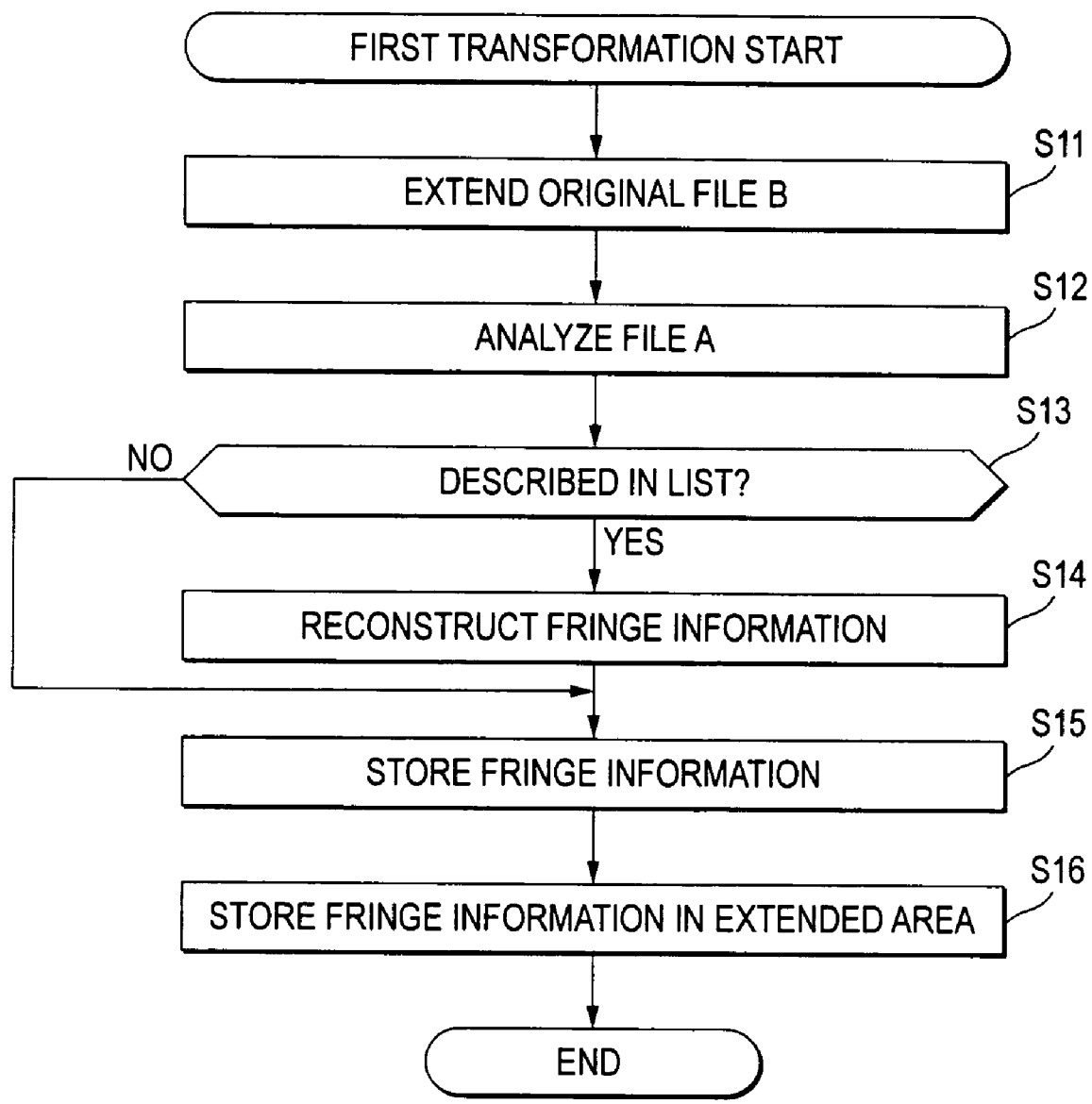
FIG. 6 is a flowchart showing a first transformation processing in the transformer for transforming the file A to the file B.

The information processor may further include a memory (such as a list memory 14 shown in FIG. 1) for storing a list of the first data and the reconstruction unit judges whether or not the second data is stored in the first file on the basis of the list stored in the memory and reconstructs the second data when the second data is stored in the first file (such as a processing in step S14 shown in FIG. 6).

An information processing method according to another embodiment of the present invention, which is adapted, in an information processor (such as the transformer 1 in FIG. 1), to transform a first file (such as a file A) of a first format (such as format A) having a first area (such as frame #1 shown in FIG. 2) for storing first data (such as fringe information "title") and a second area (such as frame #3 in FIG. 2) for storing second data (such as fringe information "123"), to a second file (such as file B) of a second format (such as format B) including a third area (such as an area provided between an XML start tag <TRACK><title> and an XML end tag </title></TRACK>) for storing the first data and having no fourth area in which the second data is stored, includes the step (such as the step S11 in FIG. 6) of extending the second file area, the first storing step (such as the step S15 in FIG. 6) of storing the first data stored in the first area in the third area, the reconstructing step (such as the step S14 in FIG. 6) of reconstructing the second data stored in the second area on the basis of the first format and the second storing step (such as the step S16 in FIG. 6) of storing the second data, which is reconstructed by the reconstructing step, in the extended area extended by the extending step.

A program, which may be recorded in a recording medium according to another embodiment of the present invention, which is adapted to execute, in a computer, a transformation of a first file (such as a file A) of a first format (such as format A) having a first area (such as frame #1 shown in FIG. 2) for storing first data (such as fringe information "title") and a second area (such as frame #3 in FIG. 2) for storing second data (such as fringe information "123") to a second file (such as file B) of a second format (such as format B) including a third area (an area provided between an XML start tag <TRACK><title> and an XML end tag </title></TRACK>) for storing the first data and having no fourth area in which the second data is to be stored, includes the step (such as the step S11 in FIG. 6) of extending the second file area, the first storing step (such as the step S15 in FIG. 6) of storing the first data stored in the first area in the third area, the reconstructing step (such as the step S14 in FIG. 6) of reconstructing the second data stored in the second area on the basis of the first format and the second storing step (such as the step S16 in FIG. 6) of storing the second data, which is reconstructed by the reconstructing step, in the extended area extended by the extending step.

Figure 7:
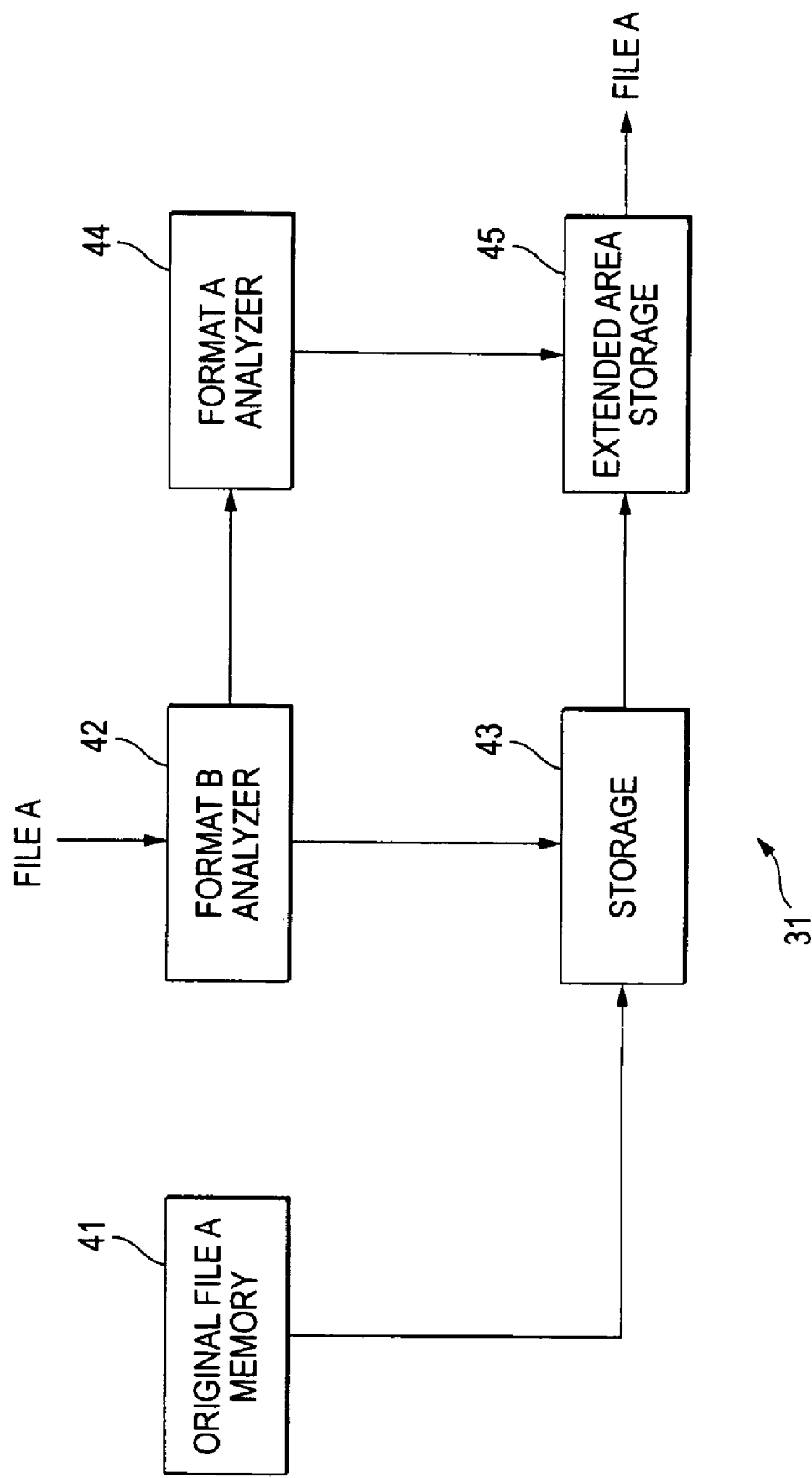
FIG. 7 is a block diagram showing an example of a construction of the transformer for transforming the file B (FIG. 5) transformed by the transformer shown in FIG. 1 to the file A.
Figure 8:
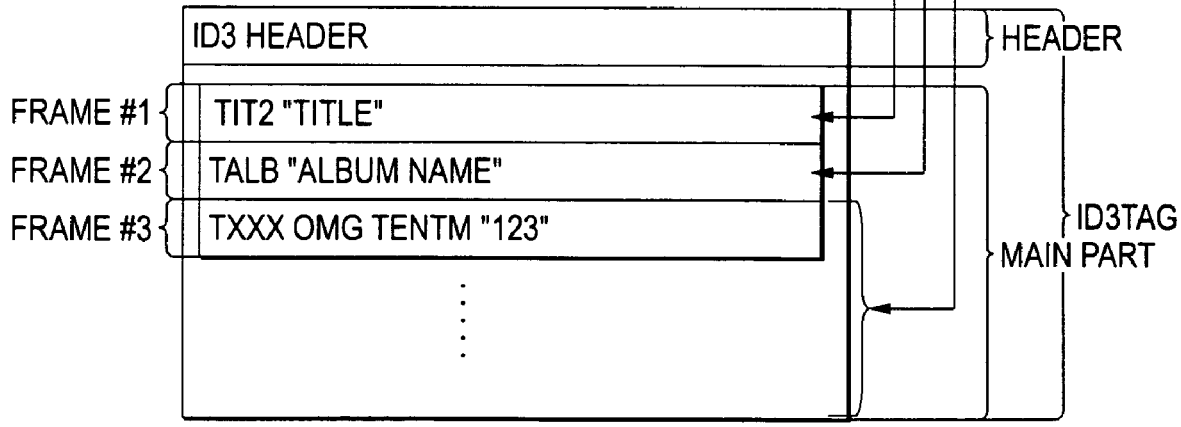
FIG. 8 shows the file B before format transformation and the file A after format transformation.

An information processor (such as a transformer 31 shown in FIG. 7) according to another embodiment of the present invention, which is adapted to transform a second file (such as a file B) of a second format (such as a format B) having a first area (such as an area between an XML start tag <TRACK><title> and an XML end tag </title></TRACK> in FIG. 8) for storing first data (such as fringe information "title") and an extended area (such as an area between an XML start tag <ETC><ID3> and an XML end tag </ID3></ETC> shown in FIG. 8) for storing third data (such as reconstructed fringe information "123" including a header and a main part including a frame #3 shown in FIG. 8), which is second data (such as fringe information "123") reconstructed on the basis of a first format (such as a format A) of a first file (such as a file A), to the first file including a second area (such as frame #1 in FIG. 8) for storing the first data and a third area (such frame #3 in FIG. 8) for storing the second data, includes a first storage (such as a storage 43 in FIG. 7) for storing the first data, which is stored in the first area, in the second area, an extraction unit (such as a format A analyzer 44 in FIG. 7) for extracting the second data from the third data and a second storage (such as an extended area storage 45 shown in FIG. 7) for storing the second data extracted by the extraction unit in the third area.

Figure 9:
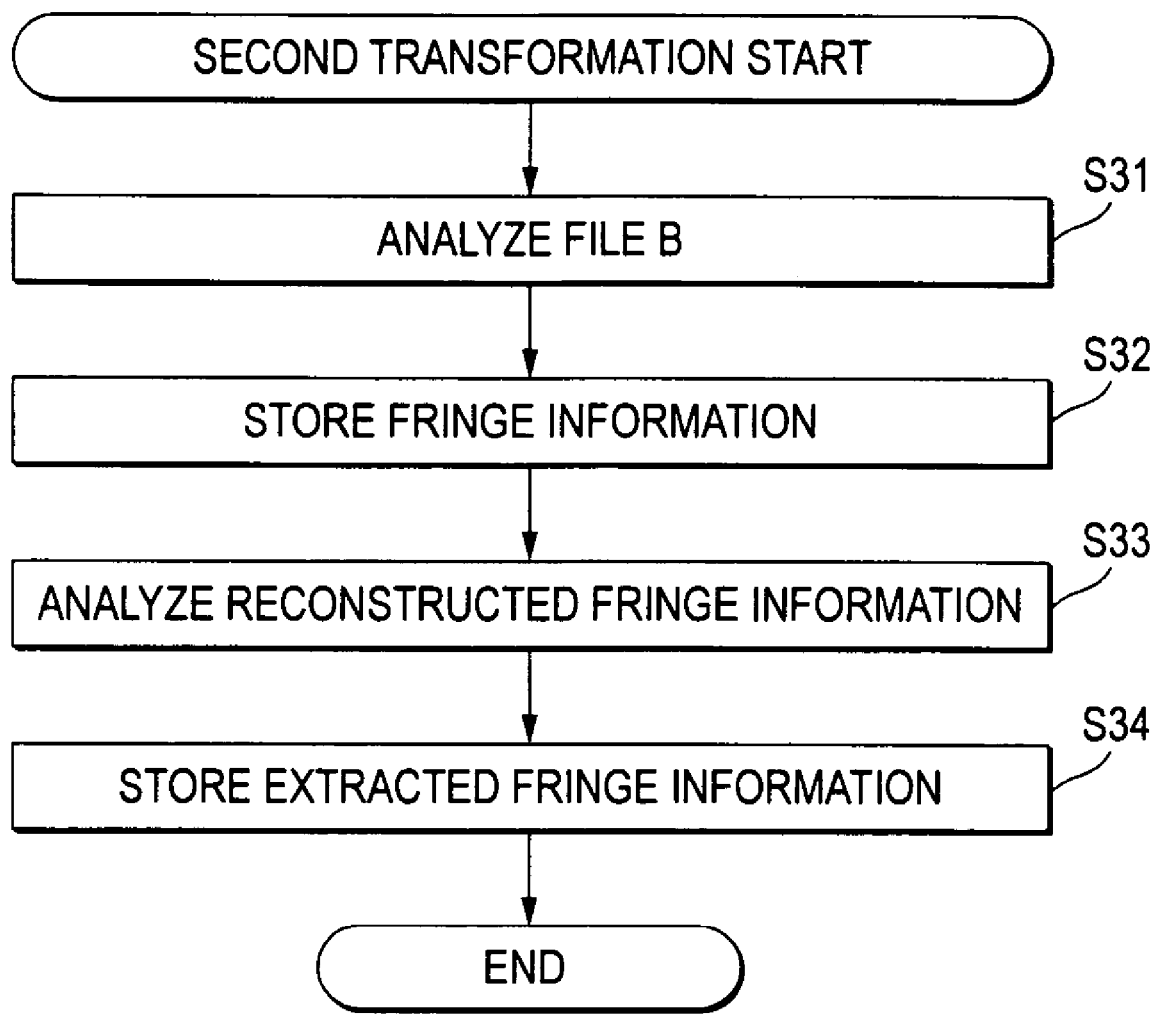
FIG. 9 is a flowchart showing a second transformation processing for transforming the file B transformed by the transformer shown in FIG. 1 to the file A.

An information processing method according to another embodiment of the present invention, which is adapted to transform a second file (such as a file B) of a second format (such as a format B) having a first area (such as an area between an XML start tag <TRACK><title> and an XML end tag </title></TRACK> in FIG. 8) for storing first data (such as fringe information "title") and an extended area (such as an area between an XML start tag <ETC><ID3> and an XML end tag </ID3></ETC> shown in FIG. 8) for storing third data (such as reconstructed fringe information "123" including a header and a main part including a frame #3 shown in FIG. 8), which is second data (such as fringe information "123") reconstructed on the basis of a first format (such as a format A) of a first file (such as a file A), to the first file including a second area (such as frame #1 in FIG. 8) for storing the first data and a third area (such frame #3 in FIG. 8) for storing the second data, includes the steps of storing first data, which is stored in the first area, in the second area (such as the step S32 in FIG. 9), extracting the second data from the third data (such as the step S33 in FIG. 9) and storing the extracted second data in the third area (such as the step S34 in FIG. 9).

A program, which may be recorded in a recording medium, according to another embodiment of the present invention, which is adapted to transform a second file (such as a file B) of a second format (such as a format B) having a first area (such as an area between an XML start tag <TRACK><title> and an XML end tag </title></TRACK> in FIG. 8) for storing first data (such as fringe information "title") and an extended area (such as an area between an XML start tag <ETC><ID3> and an XML end tag </ID3></ETC> shown in FIG. 8) for storing third data (such as reconstructed fringe information "123" including a header and a main part including a frame #3 shown in FIG. 8), which is second data (such as fringe information "123") reconstructed on the basis of a first format (such as a format A) of the first file (such as a file A), to the first file including a second area (such as frame #1 in FIG. 8) for storing the first data and a third area (such frame #3 in FIG. 8) for storing the second data, includes the steps of storing the first data, which is stored in the first area, in the second area (such as the step S32 in FIG. 9), extracting the second data from the third data (such as the step S33 in FIG. 9) and storing the extracted second data in the third area (such as the step S34 in FIG. 9).

The present invention will now be described in detail with reference to embodiments shown in the drawings.

FIG. 1 is a block diagram showing an example of a functional construction of a transformer to which the present invention is applied.

The transformer 1 shown in FIG. 1 transforms contents (referred to as "file A", hereinafter) of a format A to contents (referred to as "file B", hereinafter) of a format B.

Incidentally, in the following description, the format A is an MP3 format having a fringe information as ID3v2 and the format B is a format to which a fringe information based on an XML is attached.

The transformer 1 is constructed with an original file B memory 11, an extension portion 12, a format A analyzer 13, a list memory 14, a storage 15 and an extended area storage 16.

The original file B memory 11 stores a file (referred to as "original file B", hereinafter) of the format B, which stores nothing.

The extension unit 12 reads the original file B from the original file B memory 11, extends an area of the original file B and supplies the extended area of the original file B to the storage 15. Hereinafter, an area extended by the extension unit 12 is referred to as an extended area.

The file A is supplied to the format A analyzer 13. The format A analyzer 13 reads a list of fringe information having areas for storing both the file A and the file B from the list memory 14. Further, the format A analyzer 13 extracts fringe information stored in the file A area by analyzing the file A. The format A analyzer 13 supplies the extracted fringe information to the storage 15 or the extended area storage 16 on the basis of the list.

In concrete, when the extracted fringe information is described in the list, the format A analyzer 13 supplies the fringe information to the storage 15. That is, the format A analyzer 13 supplies fringe information having storage areas for both the files A and B among the extracted fringe information to the storage 15.

On the other hand, when the extracted fringe information is not described in the list, the format A analyzer 13 reconstructs the fringe information on the basis of the format A and supplies the reconstructed fringe information to the extended area storage 16. That is, the format A analyzer 13 reconstructs, among the extracted fringe information, fringe information other than the fringe information having storing areas in both the files A and B, that is, the fringe information not having an area to be arranged in the file B, on the basis of the format A and supplies the reconstructed fringe information to the extended area storage 16.

The list memory 14 stores the list of fringe information having the storing areas in both the files A and B.

The storage 15 stores the fringe information from the format A analyzer 13 in an area of the original file B supplied from the extension unit 12, which is arranged as a fringe information storing area, and supplies the fringe information to the extended area storage 16.

The extended area storage 16 stores the reconstructed fringe information from the format A analyzer 13 in the extended area of the original file B from the storage 15 as it is and outputs the original file B as the file B.

FIG. 2 shows an example of the file A.

The file A is constructed with a header area ("ID3 header") and a main part area. The main part is constructed with a plurality of frames in which fringe information are stored. In FIG. 2, the frames are numbered sequentially and a frame numbered i is described as frame #i.

In the frame #i (i=1, 2, . . . ), a frame ID and a fringe information are stored. For example, "TIT2" and "title" are stored in the frame #1 as frame ID and fringe information and "TALB" and "album name" are stored in the frame #2 as frame ID and fringe information. Further, "TXXX OMG TENTM" and "123" are stored in the frame #3 as frame ID and fringe information.

FIG. 3 shows an example of the original file B stored in the original file B memory 11 in FIG. 1.

The original file B starts by an XML start tag <XML> in line 1 and ends by an XML end tag </XML> in line 8. In the original file B, the XML start tag <TRACK><title> is described in line 2 in FIG. 3 and the XML end tag </title></TRACK> is described in line 4 in FIG. 3. In an area (line 3 in FIG. 3) between the tags, "title" is stored as the fringe information. Further, in line 5, the XML start tag <ALBUM><title> is described and, in line 7, the XML end tag </title></ALBUM> is described. In an area between line 5 and line 7, that is, in line 6 in FIG. 3, "album name" is stored as the fringe information. Incidentally, in the original file B, there is no area in which "123" is to be stored as the fringe information.

FIG. 4 shows an example of the list stored in the list memory 14 in FIG. 1.

In the list shown in FIG. 4, "title" and "album name" are described as the fringe information having storing areas in both the files A and B.

FIG. 5 shows examples of the file A (FIG. 2) before format transformation and the file B after format transformation.

An upper portion of FIG. 5 shows the file A before format transformation. When the file A is supplied to the format A analyzer 13 shown in FIG. 1, the format A analyzer 13 analyzes the file A and extracts the fringe information "title", "album name" and "123" stored in the frames #1 to #3.

The format A analyzer 13 supplies the extracted fringe information "title", "album name" and "123" to the storage 15 or the extended area storage 16 on the basis of the list (FIG. 4) stored in the list memory 14 shown in FIG. 1.

For example, when the extracted fringe information is "title" and "album name", the format A analyzer 13 supplies the fringe information "title" and "album name" to the storage 15 since "title" and "album name" are listed as shown in FIG. 4.

When the extracted fringe information is "123", the format A analyzer 13 reconstructs the fringe information "123" on the basis of the format A since "123" is not listed in FIG. 4. In concrete, the format A analyzer 13 stores the header and the main part constructed with the frame #3 ("TXXX OMG TENTM "123") in which the fringe information "123" is stored in the extended area storage 16 as the reconstructed fringe information "123".

A lower portion of FIG. 5 shows the file B, which is obtained by transforming the format of the file A shown in the upper portion of FIG. 5.

In the file B as shown in the lower part of FIG. 5, the area of the original file B shown in FIG. 3 is extended. That is, an extended area is provided between the XML start tag <ETC><ID3> and the XML end tag </ID3></ETC>.

As described with reference to FIG. 5, the fringe information "title" and "album name" is supplied to the storage 15 shown in FIG. 1 and the fringe information "title" and the fringe information "album name" of the file A are stored in the extended area of the file B between the XML start tag <TRACK><title> and the XML end tag </TRACK></title> and the extended area of the file B between the XML start tag <ALBUM><title> and the XML end tag </title></ALBUM>, respectively after format transformation.

Further, as described with reference to the upper portion of FIG. 5, the reconstructed fringe information "123", which is constructed with the header (ID3 header) and the frame 3# ("TXXX OMG TENTM "123") of the main part supplied from the file A analyzer 13, is supplied to the extended area storage 16. Therefore, the reconstructed fringe information "123" is stored as it is in the extended area of the file B between the XML start tag <ETC><ID3> and the XML end tag </ID3></ETC>.

FIG. 6 is a flowchart showing a first transformation processing for transforming the file A to the file B by the transformer 1 shown in FIG. 1. The first transformation processing is started when the file A is supplied to the format A analyzer 13 of the transformer 1.

In the step S11, the extension portion 12 reads the original file B (FIG. 3) from the original file B memory 11, extends the original file B and supplies it to the storage 15.

Then, in the step S12, the format A analyzer 13 analyzes the file A and extracts the fringe information. Incidentally, when a plurality of fringe information are extracted in the step S12, the processing in the step S13 to S16 to be described later is performed for each fringe information.

In step S13, the format A analyzer 13 reads out the table (FIG. 4) from the list memory 14 and determines whether or not the fringe information extracted in the step S12 is stored in the list. That is, the format A analyzer 13 determines, on the basis of the list, whether or not a fringe information, which has no area for storing the fringe information in the file B, is stored in the area of the file A.

When it is determined in the step S13 that the fringe information is stored in the list, that is, when the areas for storing the fringe information are provided in both of the file A and the file B, the format A analyze 13 supplies the fringe information to the storage 15 and the procedure skips the step S14 and goes to the step S15.

For example, when the fringe information extracted in the step S12 is "title", the fringe information "title" is supplied to the storage 15 since the fringe information "title" is listed in the table of FIG. 4 and the processing is shifted to the step S15 by skipping the step S14.

On the other hand, when it is determined in the step S13 that the fringe information is not stored in the list, that is, when a fringe information having no area therefore in the file B is stored in the area of the file A, the format A analyzer 13 reconstructs the fringe information in the step S14 and supplies it to the extended area storage 16.

For example, when the fringe information extracted in the step S12 is "123", the format A analyzer 13 reconstructs the fringe information "123" in the step S14 since the fringe information "123" is not described in the list shown in FIG. 4 and supplies the reconstructed fringe information "123" constructed with the header and the main part, which is the frame #3 in which the fringe information "123" is stored, to the extended area storage 16 and the proceeding goes to the step S15.

Then, in the step S15, the storage 15 stores the fringe information supplied from the format A analyzer 13 in the step S13 in the area of the original file B (FIG. 3) supplied from the extension portion 12 in the step S11, which is arranged to store that fringe information, and supplies the fringe information to the extended area storage 16.

For example, when the fringe information "title" is supplied from the format A analyzer 13, the storage 15 stores the fringe information "title" in the area of the original file B (FIG. 3) between the XML start tag <TRACK><title> and the XML end tag </title></TRACK> and supplies it to the extended area storage 16.

Then, in the step S16, the extended area storage 16 stores the reconstructed fringe information supplied from the format A analyzer 13 in the step S14 in the extended area of the original file B supplied in the step S15.

For example, when the reconstructed fringe information "123" constructed with the header and the frame #3 of the main part is supplied from the format A analyzer 13, the extended area storage 16 stores the reconstructed fringe information "123" as it is in the extended area of the original file B, which is between the XML start tag <ETC><ID3> and the XML end tag </ID3></ETC> in FIG. 5.

As described, the transformer 1 extends the area of the original file B in FIG. 3 and stores the fringe information "123" of the file A, which has no area to be stored in the file B, in the extended area. Therefore, it is possible to prevent the fringe information "123" contained in the untransformed file A from being lost in the transformed file B. Consequently, even when the fringe information contains an importance information, the transformer 1 can transform the format of file without risk of a lack of the important information.

Incidentally, the extension portion 12 can extend the area of the original file B only when a fringe information, area for storing which is not provided in the file B, is stored in the file A. In such case, the format A analyzer 13 analyzes the file A to decide whether or not a fringe information, which is not described in the list of the list memory 14, is stored in the file A. When the format A analyzer 13 decides that the fringe information, which is not described in the list of the list memory 14, is stored in the file A, the format A analyzer 13 supplies a control signal instructing an extension to the extension portion 12. In response to the control signal, the extension portion 12 extends the area of the original file B.

FIG. 7 is a block diagram showing a constructive example of the transformer 31 for transforming the file B transformed by the transformer 1 shown in FIG. 1 to the file A.

The transformer 31 shown in FIG. 7 is constructed with an original file A memory 41, a format B analyzer 42, a storage 43, a format A analyzer 44 and an extended area storage 45.

The original file A memory 41 stores a file (referred to as "original file A", hereinafter) of format A, which stores nothing.

The file B (FIG. 5) transformed by the transformer 1 shown in FIG. 1 is supplied to the format B analyzer 42. The format B analyzer 42 analyzes the file B, extracts fringe information stored in an area other than the extended area of the file B and supplies it to the storage 43. Further, the format B analyzer 42 extracts reconstructed fringe information stored in the extended area of the file B and supplies it to the format A analyzer 44.

The storage 43 reads out the original file A from the original file A memory 41, stores the fringe information from the format B analyzer 42 in an area of the original file A, which is arranged as a area in which the fringe information is to be stored, and supplies it to the extended area storage 45.

The format A analyzer 44 analyzes the reconstructed fringe information from the format B analyzer 42 and extracts the fringe information. Since the reconstructed fringe information is reconstructed on the basis of the format A, the format A analyzer 44 may be the same as the format A analyzer 13 shown in FIG. 1. Therefore, thee is no need of developing a new analyzer for analyzing the reconstructed fringe information stored in the extended area of the file B, so that cost reduction can be possible.

Further, the format A analyzer 44 supplies the extracted fringe information to the extended area storage 45. The extended area storage 45 stores the fringe information from the format A analyzer 44 in the area of the original file A from the storage 43, which is arranged for storing that fringe information and outputs it as the file A.

FIG. 8 shows examples of the file B before format transformation and the file A after format transformation.

An upper portion of FIG. 8 shows the file B before format transformation and is identical to the lower portion of FIG. 5. When the file B shown in the upper portion of FIG. 8 is supplied to the format B analyzer 42, the format B analyzer 42 analyzes the file B to extract the fringe information "title" stored in an area between the XML start tag <TRACK><title> and the XML end tag </title></TRACK> other than the extended area between the XML start tag <ETC><ID3> and the XML end tag </ID3></ETC> and the fringe information "album name" stored in the area between the XML start tag <ALBUM><title> and the XML end tag </title></ALBUM>. Then, the format B analyzer 42 supplies the extracted fringe information "title" and "album name" to the storage 43.

Further, the format B analyzer 42 extracts the reconstructed fringe information "123" constructed with the header (ID3 header) and the frame #3 of the main part (TXXX OMG TENTM "123") storing the fringe information "123", which are stored in the extended area between the XML start tag <ETC><ID3> and the XML end tag </ID3></ETC> and supplies the reconstructed fringe information "123" to the format A analyzer 44. The format A analyzer 44 analyzes the reconstructed fringe information "123", extracts the fringe information "123" from the frame #3 of the main part and supplies it to the extended area storage 45.

The lower portion of FIG. 8 shows the file A after the format of the file B shown in the upper portion of FIG. 8 is transformed.

As described with respect to the upper portion of FIG. 8, the fringe information "title" and "album name" are supplied to the storage 43. Therefore, the fringe information "title" is stored in the area of the frame #1, which is arranged to store the fringe information "title", of the format transformed file A and the fringe information "album name" is stored in the area of the frame #2, which is arranged to store the fringe information "album name", of the format transformed file A, as shown in the lower portion of FIG. 8.

Since the fringe information "123" from the file A analyzer 44 is supplied to the extended area storage 45 as described referring to the upper portion of FIG. 8, the fringe information "123" is stored in the area of the frame #3, which is arranged to store the fringe information "123", of the format transformed file A, as shown in the lower portion of FIG. 8.

FIG. 9 is a flowchart of a second transformation processing for transforming the file B transformed by the transformer 1 shown in FIG. 1 to the file A with the transformer 31 of FIG. 7. The second transformation processing is started, for example, when the file B is supplied to the format B analyzer 42 of the transformer 31.

In the step S31, the format B analyzer 42 analyzes the file B. Further, the format B analyzer 42 extracts fringe information from area other than the extended area and supplies the fringe information to the storage 43. The format B analyzer 42 further extracts the reconstructed fringe information from the extended area and supplies it to the format A analyzer 44.

In the step S32, the storage 43 reads out the original file A from the original file A memory 41, stores the fringe information supplied from the format B analyzer 42 in the step S31 in an area of the original file A, which is arranged to store that fringe information, and supplies it to the extended area storage 45.

For example, when the fringe information "title" is supplied from the format B analyzer 42, the storage 43 stores the fringe information "title" in the frame #1 of the original file A, which is arranged to store the fringe information "title", and supplies it to the extended area storage 45.

In the step S33, the format A analyzer 44 analyzes the reconstructed fringe information supplied from the format B analyzer 42 in the step S31 and extracts the fringe information.

In concrete, when the reconstructed fringe information "123" constructed with the header (ID3 Header) and the main part constructed with the frame #3 (TXXX OMG TENTH "123") storing the fringe information "123" is supplied from the format B analyzer 42, the format A analyzer 44 analyzes the reconstructed fringe information "123" and extracts the fringe information "123" from the frame #3 of the main part.

In the step S34, the extended area storage 45 stores the fringe information supplied from the format A analyzer 44 in the step S33 in an area of the original file A supplied from the storage 43 in the step S32, which is arranged to store that fringe information, and outputs it as the file A.

For example, when the fringe information "123" is supplied from the format A analyzer 44, the extended area storage 45 stores the fringe information "123" in the frame #3 of the original file A, which is arranged to store the fringe information "123", and outputs it as the file A.

As described, in the transformer 31, the format B analyzer 42 extracts the fringe information stored in an area other than the extended area of the file B and the reconstructed fringe information stored in the extended area and the format A analyzer 44 extracts the fringe information from the extracted reconstructed fringe information. The storage 43 and the extended area storage 45 store the fringe information stored in the area, which is other than the extended area, and the extended area of the file B in the original file A. Therefore, it is possible to prevent the fringe information contained in the file B before format transformation thereof from being lost in the transformed file A.

As a result, when the file B transformed from the file A in the transformer 1 is transformed to the file A, the file A before transformation in the transformer 1 and the file A transformed by the transformer 31 becomes identical to each other.

Incidentally, in the above description, the fringe information of the file A is ID3v2 and the format of the fringe information of the file B is XML base. However, any format can be used as the format of the fringe information, provided that there is an area for storing binary data in the format.

The described series of processing may be executed by a dedicated hardware or software. When the series processing is performed by software, a program constructing the software is installed in a general use computer, etc.

Figure 10:
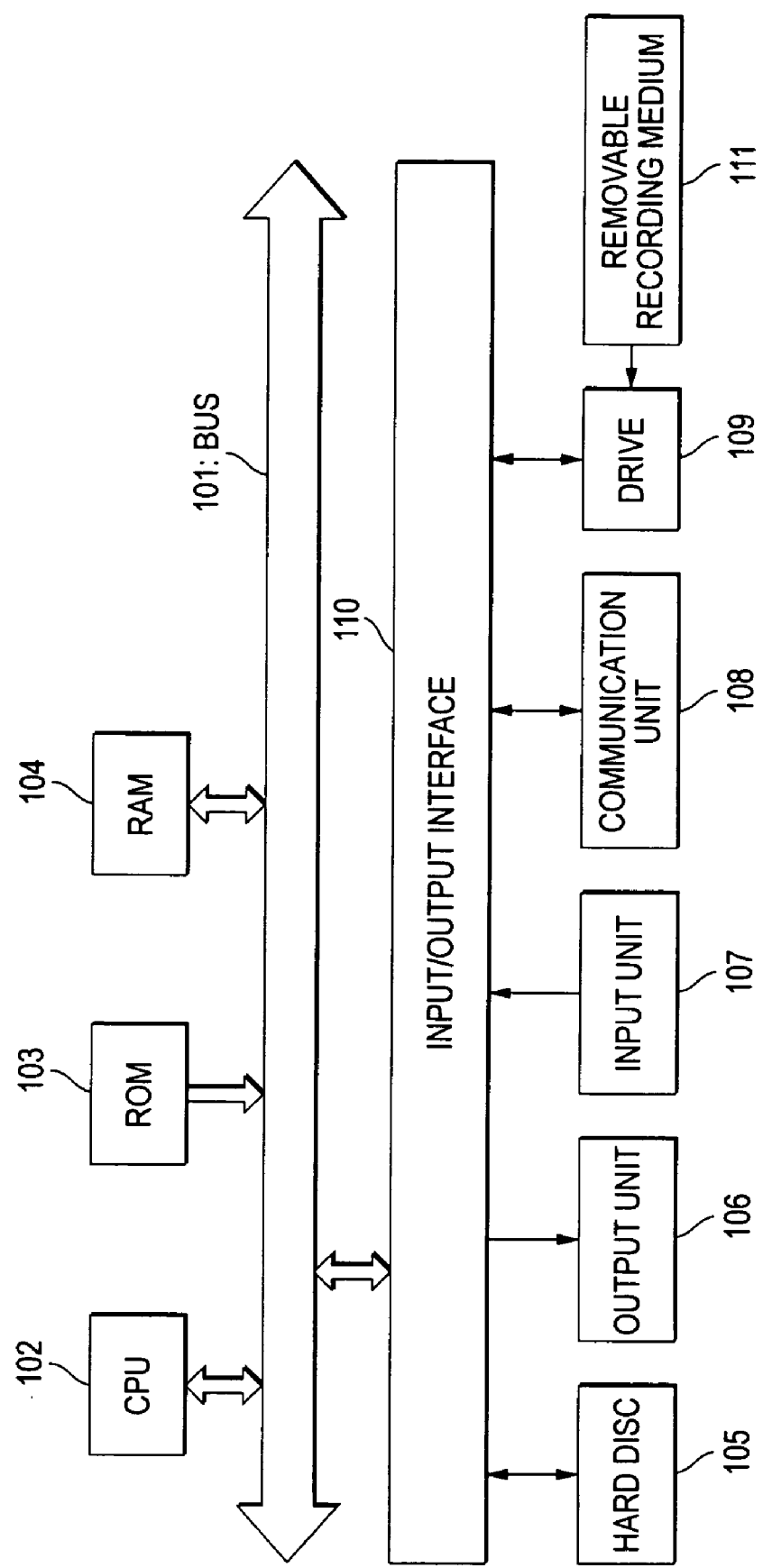
FIG. 10 is a block diagram showing an example of a construction of a computer according to an embodiment of the present invention.

FIG. 10 shows a constructive example of a computer in which a program for executing the above mentioned processing is installed.

The program may be preliminarily recorded in a hard disc 105 or a ROM 103 as a recording medium housed in the computer.

Alternatively, the program may be temporarily or eternally stored in a removable recording medium 111 such as a flexible disc, a CD-ROM (Compact Disc Read Only Memory), a MO (Megneto Optical) disc, a DVD (Digital Versatile Disc), a magnetic disc or a semiconductor memory. Such removable recording medium 111 may be provided as the so-called package software.

Incidentally, in addition to the install of the program in the computer from the above mentioned removable recording medium 111, the install is possible by transferring wirelessly the program from a download site through a broadcast satellite to the computer, or by wire through a network such as internet or LAN (Local Area Network). In such case, the computer may receive the program by a communication portion 108 of the computer and install it in the hard disc 105 thereof.

The computer includes a CPU (Central Processing Unit) 102. An input/output interface 110 is connected to the CPU 102 through a bus 101 and the CPU 102 executes the program stored in a ROM (Read Only Memory) 103 when an input portion 107 constructed with a key board, a mouse and a microphone, etc., is operated by a user through the input/output interface 110. Alternatively, the CPU 102 executes the program by loading a program stored in the hard disc 105, a program transferred from the satellite or the network, received by the communication portion 108 and installed in the hard disc 105, or a program read out from the removable recording medium 111 mounted in a drive 109 and installed in the hard disc 105 in a RAM (Random Access Memory) 104.

Thus, the CPU 102 performs the processing according to the above mentioned flowchart or the processing shown in the above mentioned block diagram. And, the CPU 102 outputs, on demand, a result of the processing from an output portion 106 constructed with an LCD (Liquid Crystal Display) or a loud speaker, etc., through the input/output interface 110, transmits it from the communication portion 108 or records it in the hard disc 105, etc.

In this specification, processing steps describing the program for causing the computer to perform various processing are not always performed according to the time sequence described as the flowchart. These steps may be processing executed in parallel or individually according to objects.

Further, the program may be processed by a single computer or by a plurality of distributed computers. Further, the program may be transferred to a remote computer and executed thereby.

It should be noted that the description in this specification is to confirm that the concrete examples supporting the inventions defined in the appended claims. Therefore, even when there are concrete examples, which are not described as corresponding to constructive requirements though described in the embodiments, it does not mean that the concrete examples do not correspond to the constructive requirements. On the contrary, even when concrete examples are described in the specification as corresponding to the constructive requirements, it does not mean that the concrete examples do not correspond to constructive requirements other than the constructive requirements corresponding to the concrete examples.

Further, the description in the specification does not mean that the inventions corresponding to the concrete examples described in the embodiments are completely defined in the claims. In other words, the specification describes the inventions corresponding to the concrete examples as the described embodiments and does not deny existence of inventions, which might be divided from this specification by divisional applications or might be added by amendment.

It should be understood by those skilled in the art that various modifications, combinations, sub-combinations and alterations may occur depending on design requirements and other factors insofar as they are within the scope of the appended claims or the equivalents thereof.

What is claimed is:

1. An information processor configured to transform a first file having an MP3 format, the file including a first area for storing first data including at least one of title and album information, and a second area for storing second data including a music time, to a second file having an XML-based format with a third area for storing the first data, comprising:
   a memory;
   an extension unit configured to extend an area of the second file to generate an XML extension area;
   a first storage unit configured to store at least one of the title information and the album information of the first data stored in the first area of the MP3 format in the third area of the XML-based format, and configured to store a first data list of fringe information included in the first file;

a reconstruction unit configured to reconstruct the second data including the music time as third data to store the second data in the second area, by first deciding whether or not the second data is stored in the first file on a basis of the first data list of fringe information and, when the second data is present in the first data list as fringe information, reconstruct the second data as third data; and a second storage unit configured to store the third data reconstructed by said reconstruction unit in the XML extension area of said extension unit, wherein the reconstruction unit reconstructs the third data with an ID3 header.

2. The information processor as claimed in claim 1, wherein the XML extension area is located between an XML start tag and an XML end tag.

3. An information processing method for transforming a first file having an MP3 format, the file including a first area for storing first data including at least one of title and album information, and a second area for storing second data including a music time, to a second file having an XML-based format with a third area for storing the first data, comprising:

extending an area of the second file to generate an XML extension area;

first storing at least one of the title information and the album information of the first data stored in the first area of the MP3 format in the third area of the XML-based format, and storing a first data list of fringe information included in the first file;

reconstructing the second data including the music time as third data to store the second data in the second area, by first deciding whether or not the second data is stored in the first file on a basis of the first data list of fringe information and, when the second data is present in the first data list as fringe information, reconstructing the second data as third data; and second storing the third data reconstructed by said reconstructing in the XML extension area of said extending, wherein said step of reconstructing reconstructs the third data with an ID3 header.

4. The method as claimed in claim 3, wherein the XML extension area is located between an XML start tag and an XML end tag.

5. A hardware recording medium recorded with a program for causing a computer to transform a first file having an MP3 format, the file including a first area for storing first data including at least one of title and album information, and a second area for storing second data including a music time, to a second file having an XML-based format with a third area for storing the first data, the program causing the computer to perform a method, comprising:

extending an area of the second file to generate an XML extension area;

first storing at least one of the title information and the album information of the first data stored in the first area of the MP3 format in the third area of the XML-based format, and storing a first data list of fringe information included in the first file;

reconstructing the second data including the music time as third data to store the second data in the second area, by first deciding whether or not the second data is stored in the first file on a basis of the first data list of fringe information and, when the second data is present in the first data list as fringe information, reconstructing the second data as third data; and second storing the third data reconstructed by said reconstructing in the XML extension area of said extending, wherein said step of reconstructing reconstructs the third data with an ID3 header.

6. The hardware recording medium as claimed in claim 5, wherein the XML extension area is located between an XML start tag and an XML end tag.

7. An information processor configured to transform a second file having an XML-based format to a first file having an MP3 format, the second file having a first area that stores first data including at least one of title and album information, and an XML extension are that stores third data, the first file having a second area for storing the first data and the third area for storing the second data, comprising:

a memory;

a first storage unit configured to store at least one of the title information and the album information of the first data stored in the first area to the second area, the second area being a data area of the MP3 format;

an extraction unit configured to extract the second data from the third data of the XML extension area to store the second data in a third area of an ID3 header tag of the MP3 format, the third data being reconstructed second data including information corresponding to a music time on the basis of a first format of a first file having the MP3 format; and a second storage unit configured to store the second data extracted by said extraction unit in the third area of the ID3 tag.

8. The information processor according to claim 7, wherein the XML extension area is located between an XML start tag and an XML end tag.

9. An information processing method for transforming a second file having an XML-based format to a first file having an MP3 format, the second file having a first area that stores first data including at least one of title and album information, and an XML extension area that stores third data, the first file having a second area for storing the first data and the third area for storing the second data, comprising:

first storing at least one of the title information and the album information of the first data stored in the first area to the second area, the second area being a data area of the MP3 format;

extracting the second data from the third data of the XML extension area to store the second data in a third area of an ID3 header tag of the MP3 format, the third data being reconstructed second data including information corresponding to a music time on the basis of a first format of a first file having the MP3 format; and second storing the second data extracted by said extracting in the third area of the ID3 tag.

10. The method according to claim 9, wherein the XML extension area is located between an XML start tag and an XML end tag.

11. A hardware recording medium recorded with a program for causing a computer to transform a second file having an XML-based format to a first file having an MP3 format, the second file having a first area that stores first data including at least one of title and album information, and an XML extension area that stores third data, the first file having a second area for storing the first data and the third area for storing the second data, the program causing the computer to perform a method comprising:

first storing at least one of the title information and the album information of the first data stored in the first area to the second area, the second area being a data area of the MP3 format;

extracting the second data from the third data of the XML extension area to store the second data in a third area of an ID3 header tag of the MP3 format, the third data being reconstructed second data including information corresponding to a music time on the basis of a first format of a first file having the MP3 format; and second storing the second data extracted by said extracting in the third area of the ID3 tag.

12. The hardware recording medium according to claim 11, wherein the XML extension area is located between an XML start tag and an XML end tag.

* * * * *